(12) United States Patent
Gruenwald (10) Patent No.: US 8,852,729 B1
(45) Date of Patent: Oct. 7, 2014

(54) SEEP RESISTANT MASKING MATERIAL

(71) Applicant: David J. Gruenwald, Menasha, WI (US)

(72) Inventor: David J. Gruenwald, Menasha, WI (US)

(73) Assignee: Davinci Engineering & Consulting, LLC, Oshkosh, WI (US)

( * ) Notice: Subject to any disclaimer, the term of this patent is extended or adjusted under 35 U.S.C. 154(b) by 0 days.

(21) Appl. No.: 13/834,151

(22) Filed: Mar. 15, 2013

(51) Int. Cl.
| | |
|---|---|
| B32B 7/02 | (2006.01) |
| B05C 21/00 | (2006.01) |
| C09J 7/02 | (2006.01) |
| C09D 175/04 | (2006.01) |
| B32B 7/12 | (2006.01) |
| B32B 25/20 | (2006.01) |
| B32B 27/40 | (2006.01) |
| B32B 27/30 | (2006.01) |
| C09J 183/16 | (2006.01) |

(52) U.S. Cl.
CPC .................. *B05C 21/005* (2013.01); *C09J 7/02* (2013.01); *C09D 175/04* (2013.01); *B32B 7/12* (2013.01); *C09J 7/0246* (2013.01); *B32B 25/20* (2013.01); *B32B 27/40* (2013.01); *C09J 7/0296* (2013.01); *B32B 27/30* (2013.01); *C09J 7/0207* (2013.01); *C09J 183/16* (2013.01)
USPC ........ 428/213; 428/214; 428/343; 428/355 R; 428/423.1; 428/447

(58) Field of Classification Search
CPC ........ B32B 25/20; B32B 27/30; B32B 27/40; B32B 7/12; C09J 7/0246; C09J 7/0296; C09J 7/0207; C09J 183/16; C09D 175/04
USPC .......... 428/213, 214, 343, 355 R, 423.1, 447
See application file for complete search history.

(56) References Cited

U.S. PATENT DOCUMENTS

| | | |
|---|---|---|
| 1,726,744 A | 9/1929 | Krug |
| 1,779,588 A | 10/1930 | Doty et al. |
| 2,171,544 A | 9/1939 | Doty et al. |
| 2,510,120 A | 6/1950 | Leander |
| 3,032,181 A | 5/1962 | Hutter et al. |
| 5,468,533 A | 11/1995 | Lipson |

(Continued)

FOREIGN PATENT DOCUMENTS

| | | |
|---|---|---|
| EP | 0724001 A1 | 7/1996 |
| FR | 2914312 A1 | 10/2008 |

(Continued)

OTHER PUBLICATIONS

PCT/US2014/021757 International Search Report and Written Opinion dated Jul. 28, 2014,—(16) Pages.

*Primary Examiner* — Bethelhem Shewareged
(74) *Attorney, Agent, or Firm* — Boyle Fredrickson, S.C.

(57) ABSTRACT

A masking material and method of forming a masking tape that includes a substrate and an adhesive layer disposed on the substrate. The adhesive layer is preferably thicker than the substrate and formed of a material that has a modulus of elasticity combined with a viscoelastic component that allows the adhesive to conform to discontinuities associated with a surface to which the masking material is applied. Preferably, the adhesive is formed in two rows that are aligned with the lateral edges of the substrate and which prevent seepage of liquid materials between the masking material and the surface to which it is applied.

15 Claims, 8 Drawing Sheets

(56) References Cited

U.S. PATENT DOCUMENTS

| | | | |
|---|---|---|---|
| 5,683,752 A | 11/1997 | Popp | |
| 5,776,572 A | 7/1998 | Lipson | |
| 5,996,927 A | 12/1999 | Weirauch et al. | |
| 6,651,379 B1 * | 11/2003 | Nelson | 43/136 |
| 6,828,008 B2 | 12/2004 | Gruber | |
| 2004/0163304 A1 * | 8/2004 | Nelson | 43/136 |
| 2005/0077003 A1 | 4/2005 | Gruber | |
| 2005/0123732 A1 * | 6/2005 | Cohen et al. | 428/215 |
| 2005/0236871 A1 | 10/2005 | Schwertfeger | |
| 2008/0318038 A1 | 12/2008 | Fucito | |
| 2010/0167030 A1 * | 7/2010 | Yanagawa et al. | 428/212 |
| 2012/0231167 A1 | 9/2012 | Langeman | |
| 2013/0122290 A1 * | 5/2013 | Tynan et al. | 428/352 |
| 2013/0256909 A1 * | 10/2013 | Xu et al. | 257/774 |

FOREIGN PATENT DOCUMENTS

| | | | |
|---|---|---|---|
| JP | 2001294821 A | 10/2001 | |
| WO | 0077111 A2 | 12/2000 | |
| WO | WO 2013/036230 A1 * | 3/2013 | C09J 7/02 |

* cited by examiner

SEEP RESISTANT MASKING MATERIAL

FIELD OF THE INVENTION

The present invention relates to adhesive masking materials, such as masking tape and more particularly, to a masking material that can be applied and removed from an underlying surface without damaging the surface, without leaving adhesive residue on the surface, and in a manner that prevents seepage of liquids between the masking material and the surface to which it is applied.

BACKGROUND OF THE INVENTION

Adhesive tapes are typically comprised of a flexible substrate, such as paper, plastic, or cloth that has a layer of adhesive material applied to at least one side of the substrate. The adhesive layer commonly covers the entire surface of one side of the substrate or can be disposed along only one longitudinal edge thereof. Such devices are commonly referred to as masking tapes suitable for protecting or masking respective portions of a surface to which liquids, such as paint, is applied wherein it is desired to generate a clean or crisp edge between the portions associated with the masking material.

Such masking tapes commonly include an adhesive that is applied as a generally very thin uniform layer across one or both of the faces of the substrate. Some manufacturers also provide masking materials wherein a respective edge of the masking material includes an adhesive that is applied to one side of the substrate and a liquid resistant material or plastic strip that is applied to the other side of the substrate to prevent contact of the liquid with the adhesive supporting substrate in an effort to improve degradation resistance of the substrate material when subjected to wet liquids. U.S. Pat. Nos. 1,726,744; 1,779,588; 2,171,544; 2,510,120 each suggest masking materials wherein relatively thin layers of adhesive are disposed along at least an edge portion of a strip of flexible substrate. U.S. Pat. No. 3,032,181 suggests a narrow band of adhesive on one or more edges of the tape and a corresponding coating on the back side of the tape to prevent adhesion and facilitate release of the adhesive from adjacent layers of the substrate when the masking material is provided as a roll.

U.S. Pat. No. 6,828,008 suggests placement of an absorbent layer on an edge of the substrate to at least substantially prevent liquids from being absorbed into the substrate and to retard the curing of liquids that may be applied to masking material. U.S. Patent Application Publication No. 2008/0318038 A1 teaches a masking material having a strip of liquid repellant material on a side of the substrate opposite the adhesive intended to prevent liquid material from adhering to the masking material.

Many of the aforementioned patents have been promoted in the marketplace as having edge sealing ability or edge blocking technology intended to prevent seepage of the liquid materials to that portion of the application surface that underlies the masking material and to maintain the integrity of the masking material to facilitate efficient removal of the same after the respective application process. Each of the disclosures referenced above attempt to resolve the long existing problem of providing a masking material that can withstand the application of liquid materials to the edge of the masking material and to do so in a manner that attempts to prevent seepage of the liquid materials to the portion of the application surface disposed generally behind the masking material. Those familiar with such products, and applicants testing associated with the present invention, clearly demonstrate that the currently available masking products perform in a manner that results in a less than desirable finished product.

The effectiveness of such masking products to prevent seepage is largely dependent on the roughness of the surface intended to be masked and when the surface is not smooth to even a small extent, seepage occurs and a clean sharp edge is not obtained. The root cause of such seepage is capillary action, or capillarity, which is the ability of a liquid to flow into very narrow spaces without the assistance of, and in opposition to external forces like gravity. The effect can best be seen in the drawing up of liquids between the hairs of a paint-brush, in a thin tube such as those used for biological or chemical testing, in porous materials such as paper, in some non-porous materials such as liquefied carbon fiber, or in a cell. Such capillary action occurs because of inter-molecular attractive forces between the liquid and solid surrounding surfaces. If a leakage path is sufficiently small, then the combination of surface tension, which is caused by cohesion within the liquid, and adhesive forces between the liquid and container act to force the liquid into the crevice or gap. Such capillary action is inadequately considered in many masking materials where small voids can be formed between the masking material and the treatment surface.

Although many of the masking materials referenced above can exhibit suitable seepage results when applied on truly planar surfaces, many if not all surfaces associated with painting activities are rarely truly planar. Particularly, the proliferation of textured wall and ceiling surfaces has proven such masking materials to have only very limited ability to adequately mask the respective portions of surfaces or adjacent surfaces for painting applications. The shortcomings of such products to adequately mask somewhat rough surfaces, such as sand textured, knock-down, orange peel, stucco or other cosmetic surface treatments is readily apparent to most users who have attempted to generate a line of demarcation between alternate liquid materials or colors applied to such surfaces.

While many of the companies that produce masking materials constructed in accordance with the patents cited herein advertise that their technology prevents paint from seeping under the edge of the tape, such assertions have shown only very limited authenticity with respect to surfaces that are not clean and very smooth, such as those encountered in most structures where the wall surfaces are "sand" or "textured" to some or even any extent. As demonstrated below with respect to the description provided with respect to FIG. 7, such assertions are frequently unsuited to replication to real life applications.

Therefore, there is a need for a masking material that can withstand the rigors of being subjected to liquid materials, can be removed from an underlying treatment surface without degradation or separation of the respective portions of the masking material, and can tolerate deformation of the masking material to match the contour of the underlying treatment surface to reduce or eliminate seepage behind the masking material while facilitating efficient removal of the masking material.

SUMMARY OF THE INVENTION

The present invention discloses a masking material that solves one or more of the aforementioned drawbacks. One aspect of the invention discloses a masking tape and method of forming a masking tape that includes a substrate and an adhesive layer secured to the substrate. The adhesive layer is preferably at least 0.003 inches thick and formed of a material that has a modulus of elasticity with a proportionate amount of tack that allows the adhesive layer to elongate and deform to match the contour of discontinuities associated with a surface to which the masking material is applied. Preferably, the adhesive layer is formed in two narrow rows that are aligned with the longitudinal edges of the substrate and which increase the unit pressure on the adhesive when applying the tape to the masked surface by reducing the effective area of adhesive in contact with the masked surface thus preventing seepage of liquid materials between the masking tape and the surface to which it is applied.

Another aspect of the invention that is usable with one or more features of the above aspect discloses a masking tape that includes a substrate and an adhesive. The substrate includes a top surface and a bottom surface and two edges that are defined by a thickness of the substrate and that separate the top and the bottom surfaces. The adhesive is disposed on the bottom surface along at least one edge of the substrate. The adhesive extends in an outward direction from the bottom surface of the substrate to define a thickness of the adhesive that is greater than 0.003 inches and is elastically deformable when coming in contact with a surface such as a painted wall to at least more than 1.25 times an at-rest thickness of the adhesive.

Another aspect of the invention that is usable with one of more of the features or aspects above discloses a tape assembly that includes a substrate layer and an adhesive layer. The substrate layer has opposing faces and opposing edges that each extend a longitudinal length of the substrate such that the opposing faces are oriented transverse to a thickness of the substrate layer defined by a length of the opposing edges. The adhesive layer is secured to at least one of the faces of the substrate layer such that an edge of the adhesive layer is aligned with at least one of the opposite edges of the substrate layer and the adhesive layer has a thickness as defined by a dimension that is aligned with the thickness of the substrate layer and that is at least 1.5 times greater than the thickness of the substrate layer.

Another aspect of the invention that is usable with one or more of the above aspects or features discloses a method of forming a masking tape that includes applying multiple rows of adhesive to a backer material. The backer material and the multiple rows of adhesive are formed into an elongated roll by rolling the backer material onto itself so that the multiple rows of adhesive are captured between adjacent layers of backer material. The elongate roll is partitioned into discrete rolls that each have a maximum diameter that is the same as the elongated roll by cutting the elongate roll at locations that divide at least one of the multiple rows of adhesive into a first portion that is associated with an end of a first discrete roll and a second portion that is associated with an end of a second discrete roll.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode presently contemplated for carrying out the invention.

FIGS. 4A and 4B show a table that associates the thickness of the adhesive layer relative to a peak to peak surface roughness associated with the surface to be treated.

While masking devices or tapes and methods of forming and using the same are susceptible to various modifications and alternative forms, specific embodiments thereof have been shown by way of example in the drawings and are herein described in detail. It should be understood, however, that the description herein of specific embodiments and methods is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1:
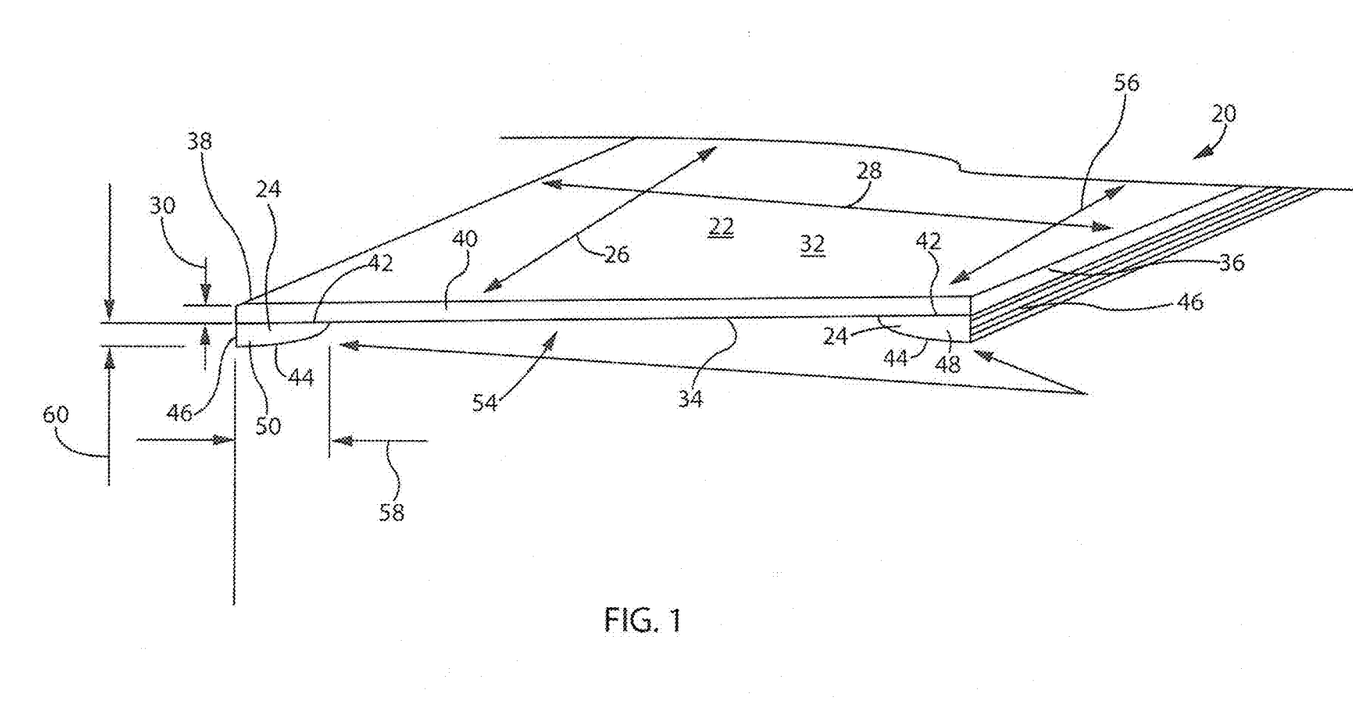
FIG. 1 is a perspective end view of a masking material according to the present invention.

FIG. 1 shows an end perspective view of a masking tape or masking material 20 according the present invention. Masking material 20 includes a backer material or substrate 22 and an adhesive 24 disposed thereon. Substrate 22 is generally defined by a layer having a length 26, a width 28, and a depth or thickness 30. Substrate 22 includes a first side or surface 32 and a second side or surface 34 whose shape is defined by length 26 and thickness 30 of substrate 22. Surfaces 32, 34 can generally be considered the opposite working surfaces of material 20 wherein one side is directed to face a treatment surface and the other side faces atmosphere. Substrate 22 includes a first edge 36 and a second edge 38, or opposite opposing lateral edges or sides, associated with length 26 and thickness 30. Substrate 22 includes a terminal end or edge 40 that is defined by width 28 and thickness 30. Preferably, substrate 22 is formed of a flexible material such as plastic, cloth or paper and such that thickness 30 has an approximate dimension of between 0.001 inches and 0.005 inches of total thickness.

Adhesive 24 is disposed on at least one of side surfaces 32, 34 of substrate 22 proximate at least one of edges 36, 38. Preferably, adhesive 24 defines alternate beads wherein a respective bead is positioned proximate each of edges 36, 38 as explained further below. Adhesive 24 includes a first side or surface 42 that engages surface 34 of substrate 22 and another surface 44 that is generally opposite surface 42. Adhesive 24 includes an edge 46 that is generally aligned with a respective edge 36, 38 of substrate 22.

As shown in FIG. 1, masking material 20 is provided with a first row or bead 48 and a second row or bead 50 of adhesive 24 wherein each bead 48, 50 extends along length 26 of substrate 22. Preferably, material 20 includes a bead 48, 50 that is positioned proximate each respective edge 36, 38 of substrate 22 such that a gap 54 is formed between first bead 48 and second bead 50 of adhesive 24. Although two rows or beads 48, 50 of adhesive 24 are shown engaged with surface 34 of substrate 22, it is appreciated that other numbers of rows of beads can be provided and disposed on surface 34 of substrate 22 or disposed in gap 54. It is further appreciated that the entirety of surface 34 of substrate 22 could be covered with adhesive 24 but that doing so would result in an increased cost without substantial performance improvement for most applications. Preferably, depending on the dimension of width 28 of substrate, gap 54 can include one or more rows or interstitial amounts of adhesive 24 along length 26 to limit deformation of substrate 22 during use of masking material 20 and to facilitate a more uniform shape of masking material 20 when provided in a roll configuration.

Each bead 48, 50 of adhesive 24 is defined by a length 56, a width 58 and a depth or thickness 60 associated therewith. As used herein, it should be appreciated that length 56 of respective beads 48, 50 are oriented in the same direction as length 26 of substrate 22, width 58 of respective beads 48, 50 are oriented in the same direction as width 28 of substrate 22, and thickness 60 of perspective beads 48, 50 are oriented in the same direction as thickness 30 associated with substrate 22. In a preferred embodiment, each bead 48, 50 of adhesive 24 has a width 58 that can be between 0.040 and about 0.200 inches and a respective thickness 60 that is preferably greater than about 0.003 inches and is more preferably between about 0.010 inches and about 0.100 inches. As used herein the term "about" is intended to incorporate those values within +/−0.007 of the lowermost adhesive thickness parameter and within +/−0.050 of the uppermost adhesive thickness parameter or parameters approximately or nearly, and in the context of a numerical value or range set forth, ±10% of the numerical value or range recited or claimed. Preferably, width 58 of adhesive 24 is greater than the depth or thickness 60 of adhesive 24. Preferably, the dimension of width 58 and thickness 60 are related by a ratio of approximately 3:1. In a preferred embodiment of the present invention, adhesive 24 is provided in one or more beads that have a thickness 60 in the range of approximately 0.020-0.040 inches and a width 58 that can be any dimension but is preferably 0.060-0.120 inches. It is however appreciated that other ratios of the geometry of adhesive 24 are envisioned to satisfy the requirements related to the adhesion and tack of masking material 20 relative to both itself as well as treatment surfaces as explained further below.

Figure 2:
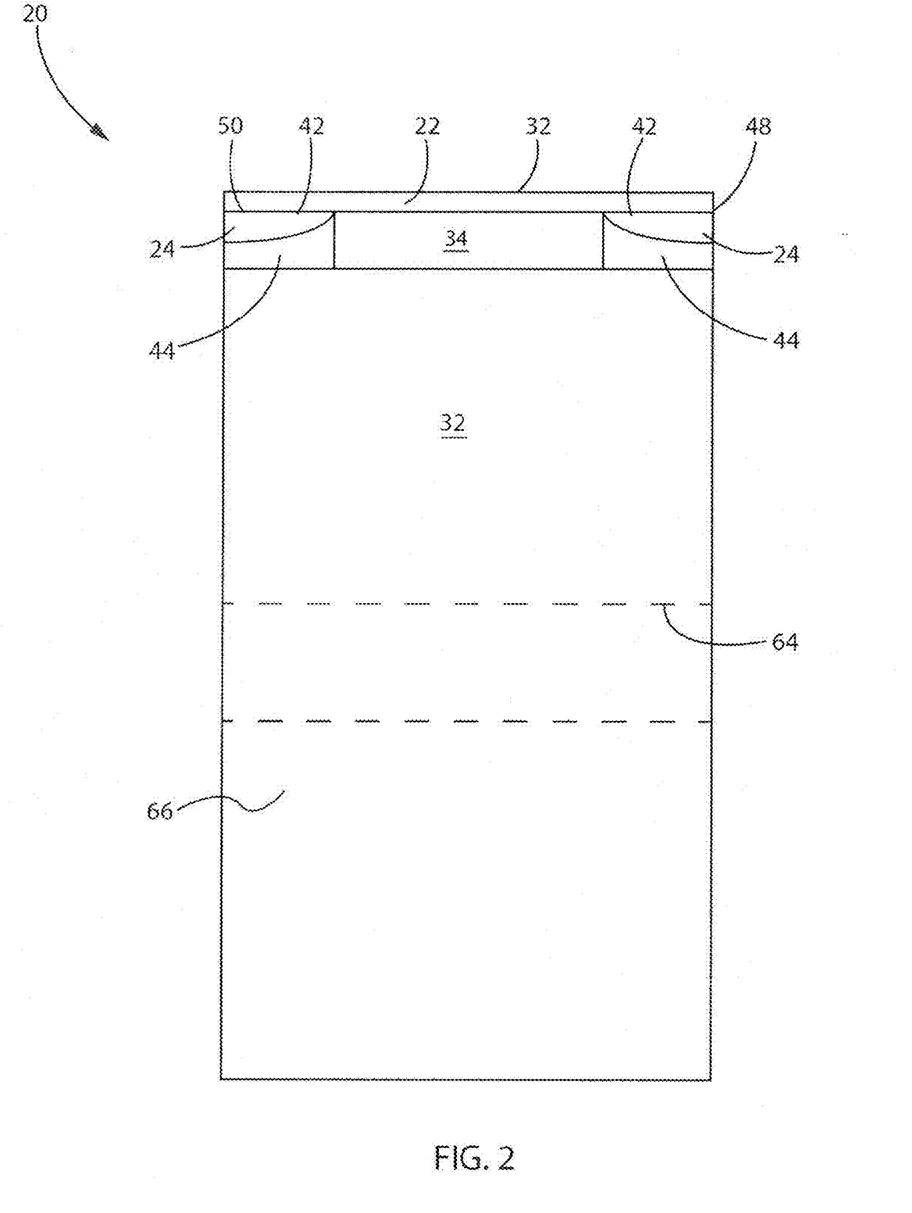
FIG. 2 is a front elevation view of a roll of the masking material shown in FIG. 1.

FIG. 2 shows a side elevation view of masking material 20 in a roll configuration as indicated by a core 64 associated with roll 66 of masking material 20. As shown therein, beads 48, 50 of adhesive 24 are disposed between adjacent layers of substrate 22 such that surface 42 of beads 48, 50 is disposed on surface 34 of substrate 22 and surface 44 removably cooperates with surface 32 of substrate 22 associated with an adjacent layer of the respective roll 66. Masking material 20 is constructed to be dispensed from roll 66 by peeling or unrolling of substrate 22 and respective beads 48, 50 of adhesive 24 from underlying layers of substrate 22. As explained further below, surface 32 of substrate 22 can be treated to prevent adhesion of adhesive 24 therewith but to maintain sufficient interaction to maintain the rolled orientation of material 20. It is further appreciated that material 20 could be provided in sheet or strip form rather than roll form although most users are fairly familiar with the roll type configuration of such masking materials.

Adhesive 24 associated with beads 48, 50 of masking material 20 is preferably selected from the group that includes at least polyurethane gel adhesives, silicone gel adhesives, and acrylic gel adhesives although it is appreciated that other types of adhesives may be formed and which exhibit the attributes discussed below. Preferably, substrate 22 and adhesive 24 are selected to satisfy various parameters associated with the usage of masking material 20 such as preventing a liquid such as paint from contacting a surface that has irregularities or texture and is located behind or covered by masking material 20. Surface 32 of substrate 22 may be treated to facilitate a convenient release of adhesive 24 therefrom, such as silicone coating, to enable the respective layers of mask material 20 to be rolled onto itself and easily unrolled from adjacent layers when provided in a rolled configuration such as roll 66. Surface 34 of substrate 22 may be prepared for the desired inseparable adhesion of adhesive 24 to surface 34 of substrate 22. Preferably, adhesive 24 has an approximate shore hardness on the 00 scale of 20.

Figure 3:
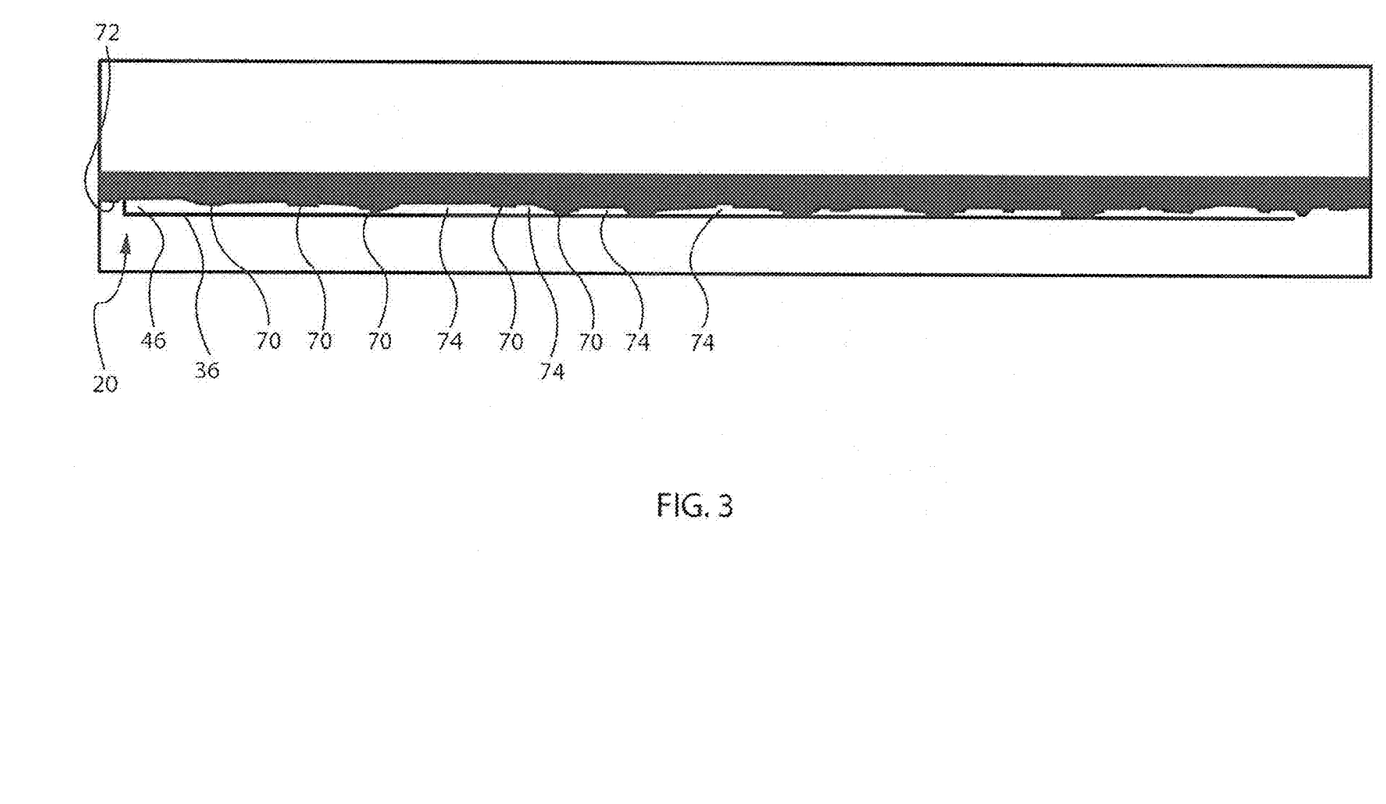
FIG. 3 is a top plan view of the masking material shown in FIG. 1 engaged with an exemplary treatment surface.

Referring to FIG. 3, adhesive 24 preferably exhibits viscoelastic properties as explained further below, that allow adhesive 24 to conform to uneven surfaces associated with a treatment surface 72 through the action of cold flowing to achieve the herein described sealing characteristics with a respective application or treatment surface. FIG. 3 is a top plan view of a portion of masking material 20 engaged with portion of a treatment surface 72 that includes a number of peaks 70 that are separated by adjacent valleys 74 associated with treatment surface 72. Adhesive 24 conforms to the shape of surface 72 to fill voids, cavities, or valleys 74 between adjacent peaks 70 of a treatment surface 72 that underlie masking material 20 to form an effective barrier to leakage or seepage, including seepage caused by capillary action, between masking material 20 and a treatment surface 72 to which the masking material 20 is applied. It should be appreciated that the view shown in FIG. 3 is indicative of a side plan view of a respective edge 36 of substrate 22 and a corresponding edge 46 of a respective bead 48, 50 of adhesive 24. Preferably, edges 36, 46 are coplanar. The viscoelastic properties of adhesive 24 allows adhesive 24 to comply to the exact contour of treatment surface 72 and in a manner wherein adhesive 24 maintains secure interaction with substrate 22 for subsequent removal of masking material 20 from treatment surface 72 but can withstand the rigors associated with painting activities that overlap material 20. Adhesive 24 preferably exhibits a unique combination of physical properties to eliminate seepage under most conditions and still be removable from surfaces of drastically differing surface energy as are found in normal conditions and that is uncommon to most commercially available adhesives.

It is appreciated that masking material 20 may be configured to cooperate with various different treatment materials that have discrete respective surface roughness profiles. That is, where "smoother" but none the less non-planar surfaces are to be treated, adhesive 24 can be provided with beads having lower thicknesses 60 as compared to surfaces having more abrupt or aggressive surface discontinuities, such as stucco or knock-down texture treatments. Providing roll 66 in various bead configurations allows the user to select the masking product having a thickness 60 of adhesive 24 suitable for a given application or intended use. Such a consideration also allows more judicious and economical use of only necessary quantities of adhesive 24 for particular tasks.

Regardless of the application or intended use of masking material 20, adhesive 24 is preferably provided so as to satisfy the parameters set forth in the following table and the information provided in FIGS. 4A and 4B with respect to the tack between surface 34 of substrate 22 and adhesive 24, the separable tack between surface 32 of substrate 22 and adhesive 24, and the separable tack between treatment surface 72 and surface 44 of adhesive 24:

TABLE 1

| Masking Adhesive Specification | Units | Minimum Value | Ideal | Maximum Value |
|---|---|---|---|---|
| 8 mm depth, ½" diameter probe, .50 mm/sec penetration rate load | Grams | 1000 | 2100 | 3200 |
| Tack caused elongation on MSE surface (Primer) (% of initial thickness) | % | 30 | 52.5 | 75 |
| Tack caused elongation on LSE surface (Lexan) (% of inital thickness) | % | 25 | 37.5 | 50 |
| Tack caused elongation (%) on HSE surface (Stainless Steel) (% of initial thickness) | % | 40 | 70 | 100 |
| Tack ratio on MSE surface (Primer) (tack in psi divided by total elongation %) | psi (lbs/sq. in.) | 9.5 | 24.75 | 40 |
| Tack ratio on LSE surface (Lexan) (tack in psi divided by total elongation %) | psi (lbs/sq. in.) | 9.5 | 24.75 | 40 |
| Tack ratio on HSE surface (Stainless Steel) (tack in psi divided by total elongation %) | psi (lbs/sq. in.) | 9 | 24.5 | 40 |
| Thickness | Inch | 0.01 | 0.045 | 0.08 |

Figure 4B:
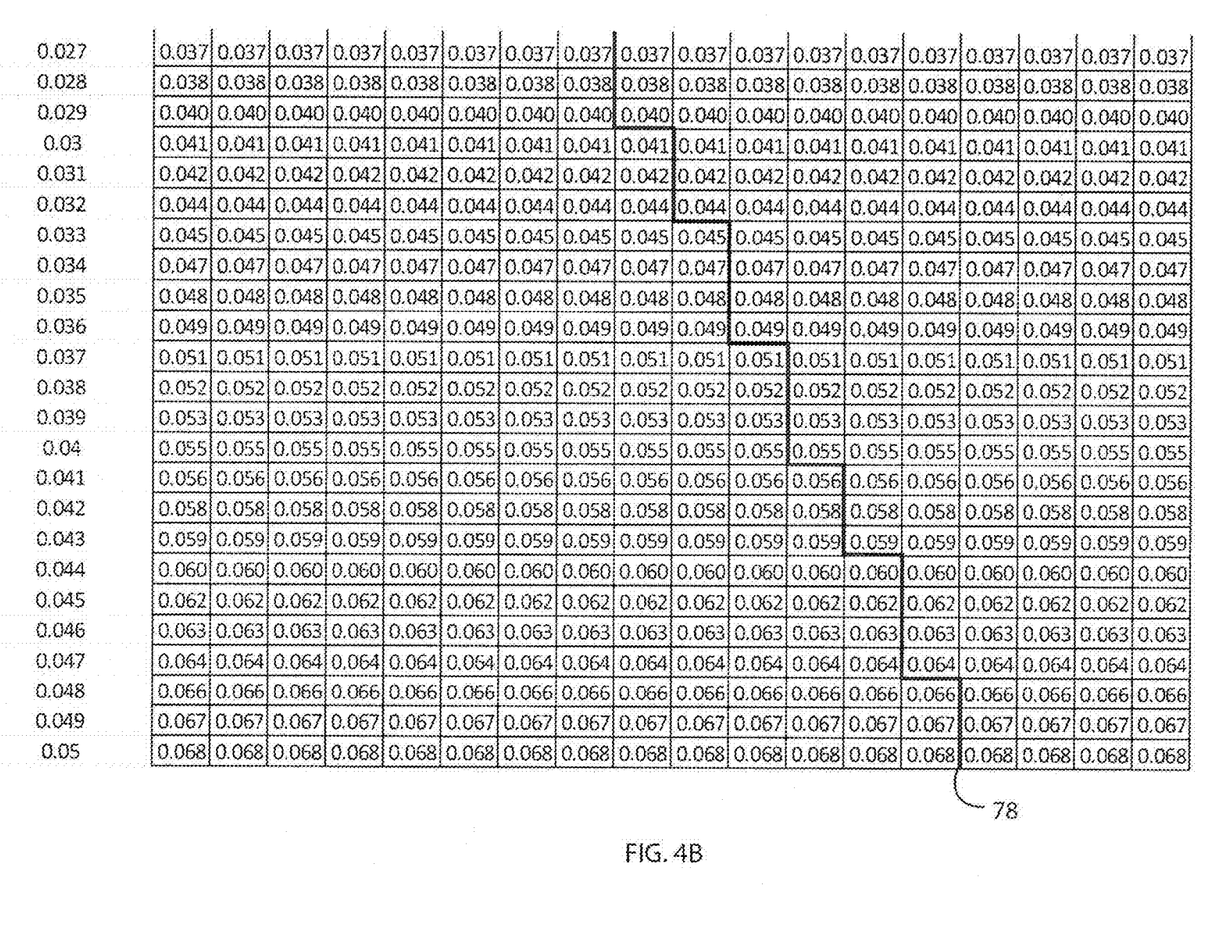

FIGS. 4A and 4B include further information indicative of achieving the desired tack and/or adhesion interaction explained above and shows a line of demarcation 78 wherein the thickness 60 of adhesive 24 can be manipulated to provide the desired full contact engagement with a treatment surface as a function of the peak-to-peak surface roughness associated with various treatment surfaces as a function of the bead thickness 60 associated with maintaining continuous contact of adhesive 24 with the underlying treatment surface thereby reducing or preventing seepage of liquid materials to those areas that underlie masking material 20.

Preferably, adhesive 24 is a gel type material or a material that is sufficiently pliable so as to conform to the discontinuities associated with treatment surface 72 without separating from substrate 22 and is yet conveniently wholly removable from the treatment surface via user manipulation of substrate 22. Preferably, substrate 22 and adhesive 24 cooperate with one another in a manner that resists cohesive failure of adhesive 24 relative to substrate 22 during removal or manipulation of masking material 20 during use—aside from tearing or cutting terminal ends or edge 40 of a respective length of material 20. As used herein, the tack of adhesive 24 is the immediate strength of the bond of adhesive 24 with a surface and adhesion is a longer term strength of a respective bond. That is, tack forms immediately or in seconds whereas adhesion bond strengths increase over time. Adhesive 24 is preferably selected to provide a desired tack value with a preferably low adhesion value. During testing, polyurethane gels displayed desired tack parameters with acceptable adhesion values even after extended periods of contact of adhesive 24 with treatment surfaces 72. Preferably, adhesive 24 is selected to maintain complete contact with treatment surface 72 without returning to an at rest shape of the adhesive and does so in a manner that maintains a secure interaction of the adhesive 24 with surface 34 of substrate 22 for subsequent removal of masking material 20 without detriment to surface 72 during the removal process, such as the undesired removal of paint that may have been previously applied to treatment surface 72.

During application of material 20, material 20 can be applied with finger or palm pressure such that adhesive 24 populates valleys 74 and contacts peaks 70 to define a continuous interaction with surface 72. Although adhesive 24 wants to return to an original or at rest shape, adhesive 24 is selected to have a stiffness or modulus (ratio of stress to strain) that is insufficient to overcome the tack associated with the interaction of adhesive 24 with surface 72 thereby maintaining contact engagement with the entirety of demarcation associated with edge 36, 46 and surface 72. Gap 54 (FIG. 1) associated with masking material 20 allows expedient removal of masking material 20 from the underlying surface with a fraction of the total force that would be required to effectuate the same removal were surface 34 fully occupied by adhesive 24. Understandably, allowing adhesive 24 to extend from edge 36 to edge 38 of substrate 22 may be desirable in other applications but for applications intended to generate only a single line of demarcation between surface treatments, only one of edges 36, 38 need include a bead 48, 50 of adhesive 24. It is further appreciated that providing both edges with beads 48, 50 of adhesive 24 can prove beneficial to forming of a uniform roll 66.

Various efforts undertaken to assess the merits of various alternative adhesives included consideration of the contact tack generate elongation of various adhesives when subjected to various probes having different degrees of surface porosity. The testing process included subjecting various adhesives to a primer coated probe, a brushed stainless steel probe, and a polycarbonate probe. Once placed in contact with the respective adhesives, the probe was withdrawn and the elongation of the adhesive was assessed relative to an at rest configuration of the adhesive. This testing provided the assessment that adhesives that exhibit at least 25% contact tack generated elongation when associated with a polycarbonate material proved to have an effective elongation and tack association to achieve one or more of the objectives disclosed herein.

Figure 5:
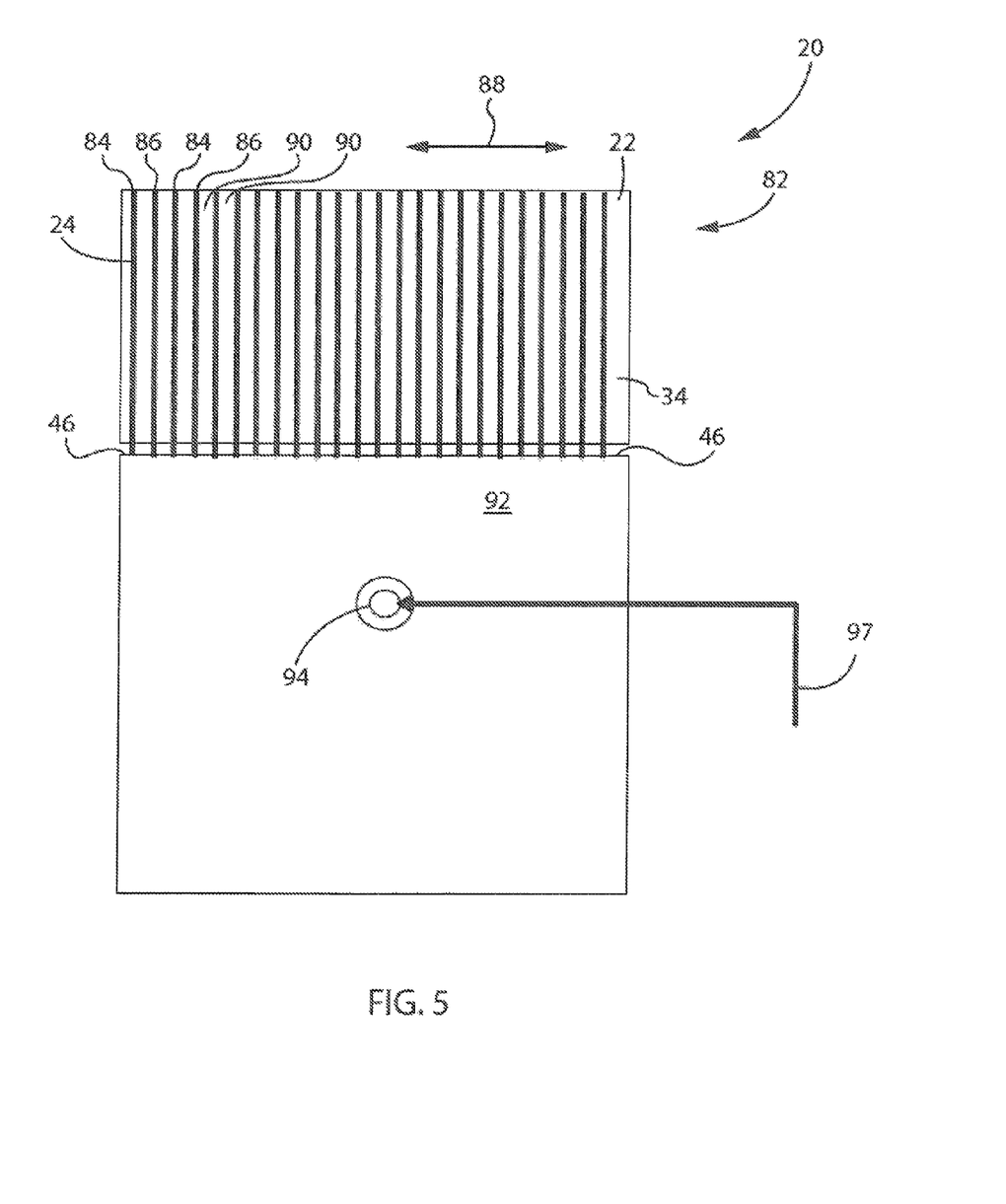
FIG. 5 is a plan view of an exemplary manufacturing process associated with producing the masking material shown in FIG. 1.
Figure 6:
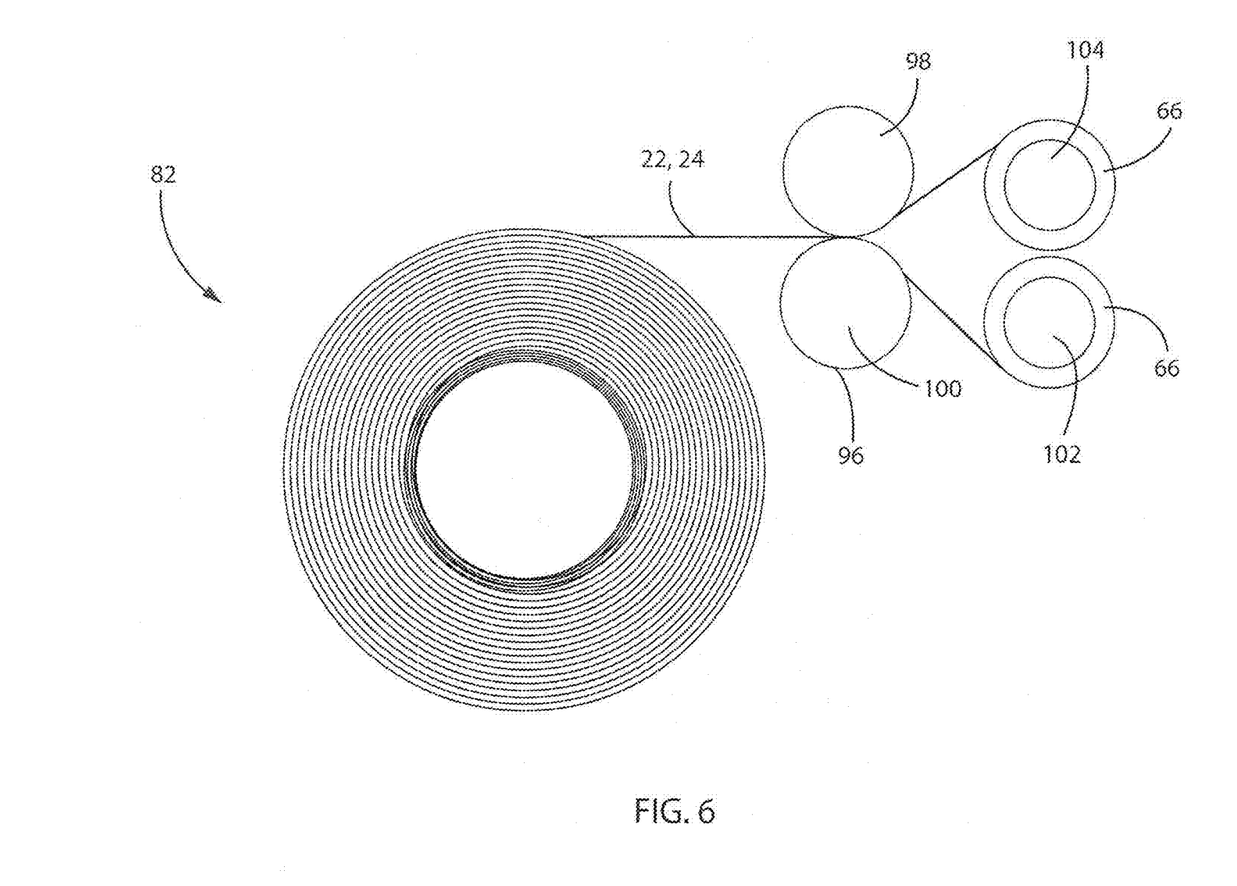
FIG. 6 is an elevation view of a splitting process associated of the masking material shown in FIG. 1 when produced with the exemplary manufacturing process shown in FIG. 4.

FIGS. 5 and 6 show schematic representations associated with generating one or more rolls 66 of masking material 20. Elongated roll 82 of masking material 20 can be formed by disposing one or more elongated beads 84, 86 of adhesive 24 along a longitudinal length, indicated by arrow 88, of roll 82. Beads 84, 86 are supported by surface 34 of substrate 22 in spaced relation relative to adjacent beads such that one or more gaps 90 are formed between adjacent beads 84, 86 of adhesive 24. A die or other reservoir 92 includes an input 94 and a plurality of outputs 96 associated with communicating adhesive 24 from a bulk source 97 to surface 34 of substrate 22 in respective beads 84, 86. It is appreciated that source 97 can be configured to cooperate with a uniform adhesive material and/or configured to receive the constituent parts associated with forming adhesive 24.

Referring to FIG. 6, roll 82 can be subsequently cut or bifurcated into individual rolls 66 having a desired width via the passage of the respective layers of substrate 22 and associated rows or beads of adhesive 24 through a cutting or splitting device 99 associated with cutting of roll 82. Preferably, splitting device 99 cooperates with masking material 20 passed between a first roller 98 and a second roller 100 so as to cut or otherwise split roll 82 at locations associated with each of beads 84, 86 so that a respective portion of each bead 84 is associated with a first roll 102 and a second roll 104 and a respective portion of each bead 86 is also associated with first roll 102 and second roll 104. Said in another way, each bead 84, 86 is split to form the respective bead 48, 50 associated with the opposite lateral edges of roll 66 of masking material 20. Operation of splitting device 99 ensures that each of the alternate edges 36, 38 associated with substrate 22 and edges 46 associated with respective beads 48, 50 are provided in a substantially coplanar configuration relative to the respective edges 36, 38 of each discrete roll 66 and are generally normal or transverse to surfaces 32, 34 of substrate 22.

Figure 7:
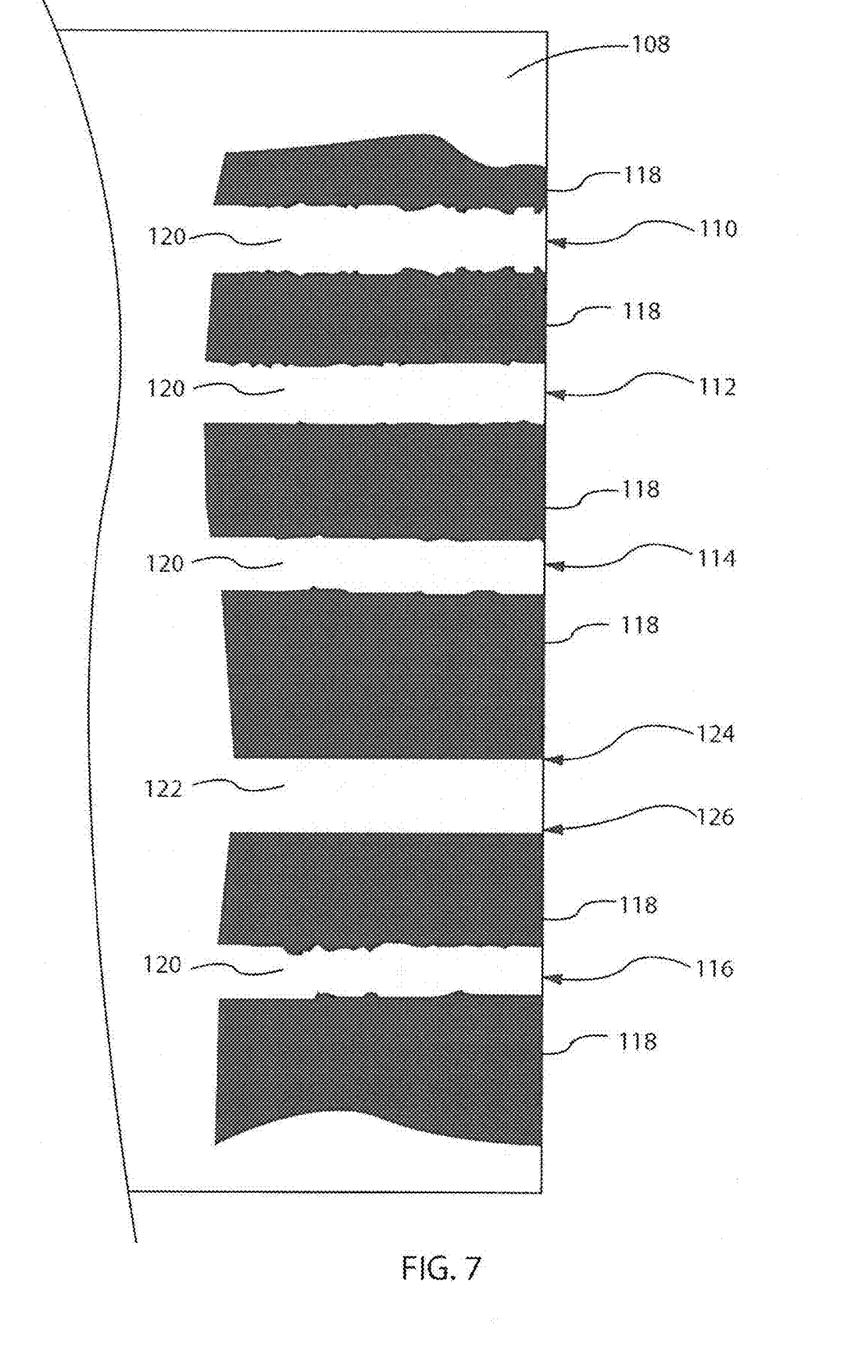
FIG. 7 is a elevation view and shows the seepage resistant results achieved with the masking material shown in FIG. 1 as compared to various other self asserted seepage proof masking materials.

FIG. 7 shows a performance comparison of masking material 20 to various commercially available masking products that are advertised as having seepage resistance constructions and performance. As shown in FIG. 7, a treatment surface 108 having a substantially similar surface finish along the entirety thereof had various masking materials applied thereto and was subsequently painted such that the paint was applied over each of the respective masking products. With respect to masking products 110, 112, 114, and 116, various degrees of seepage are clearly visible between painted portions 118 and the unpainted or masked portions 120 of surface 108 such that each of products 110, 112, 114, and 116 are associated with varying degrees of less than desirable demarcation between the masked and unmasked areas of sample surface 108. Many of the masking materials associated with products 110, 112, 114, and 116 have adhesive layers that extend the entirety of one surface of the substrate and have thicknesses that range generally from 0.0005 inches to 0.001 inches.

Comparatively, still referring to FIG. 7, masking material 20 was applied at area 122 of surface 108 such that a substantially crisp or linear area of demarcation 124, 126 are provided at the alternate lateral edges of associated with the interface between area 122 and adjacent painted portions 118. Adhesive 24 is provided at thicknesses that range for 0.003 inches and preferably about 0.010 inches to 0.050 inches or approximately 50 times the thickness of the adhesive thickness associated with prior masking materials. Preferably, the adhesive layer secured to at least one of the faces of the substrate layer such that an edge of the adhesive layer is aligned with at least one of the opposite edges of the substrate layer and the adhesive layer has a thickness as defined by a dimension that is aligned with the thickness of the substrate layer and a width that is defined by a dimension that is transverse to the direction of the width such that a ratio of the width to the thickness of the adhesive layer is between about 2:1 and about 15:1. For example, a 0.010 inch thick bead has a width that is preferably between about 0.020 inches and 0.150 inches wide. From a functioning standpoint, the bead should be as narrow as the slitting or cutting equipment can tolerate while maintaining continuous edge of the adhesive. Making the bead narrower than perhaps about 0.060 inches is expected to maintain functionality of the adhesive without detracting from the cutting process and would decreasing manufacturing costs. Preferably, the adhesive has a width and a thickness that is sufficient to maintain about 0.030 inch of sealed interaction with the treatment surface.

It should further be noted that removal of masking material 20 from area 122 left no residual indication of the presence of masking material 20 and did not blemish the surface 108 associated with removal of masking material 20. FIG. 7 clearly shows the advantages associated with utilization of masking material 20 for painting applications as compared to other various commercially available masking materials with respect to the seepage performance of masking material 20.

Therefore, masking material 20 provides a masking material that includes a substrate and an adhesive layer that is disposed on the substrate and is preferably greater than 0.003 inches thick and formed of a material that has a modulus of elasticity that allows the adhesive to conform to discontinuities associated with a surface to which the masking material is applied. Preferably, the adhesive is formed in multiple rows wherein at least one of the rows or beads is aligned with a lateral edge of the substrate to prevent seepage or capillary action of liquid between the masking material and the surface to which it is applied. Masking material 20 provides a temporary but secure interaction with the underlying surface to mitigate seepage in a manner that allows expedient removal of the entirety of the masking material from the underlying surface and in a manner that does not mare or otherwise deface the underlying surface or surface finishes or treatments.

What is claimed is:

1. A masking material comprising:
   a substrate having a top surface and a bottom surface, the substrate having two edges that are defined by a thickness of the substrate and that separate the top and the bottom surfaces; and
   an adhesive disposed on the bottom surface along at least one edge of the substrate, the adhesive extending in an outward direction from the bottom surface of the substrate to define a thickness of the adhesive that is greater than 0.03 inches and is elastically deformable at least more than 1.25 times an at rest thickness of the adhesive.

2. The masking material of claim 1 wherein the adhesive is disposed on the bottom surface of the substrate along at least both edges and each of the edges of the substrate are aligned with a respective outer edge of the adhesive relative to directions transverse to the thickness of the adhesive.

3. The masking material of claim 2 further comprising an amount of adhesive disposed between the adhesive associated with the edges of the substrate.

4. The masking material of claim 3 wherein the adhesive extends continuously between the edges along the bottom surface of the substrate.

5. The masking material of claim 1 wherein the substrate and adhesive are provided in a roll shape wherein the adhesive disposed on the bottom surface of one layer of the substrate removably cooperates with the top surface of an adjacent layer of the substrate without removing the adhesive from the bottom surface of the substrate.

6. The masking material of claim 1 wherein the adhesive has a thickness of at least 0.010 inches.

7. The masking material of claim 1 wherein the adhesive is selected from the group consisting of polyurethane gel adhesive, silicone gel adhesive, and acrylic gel.

8. A tape assembly comprising:
   a substrate layer having opposing faces and opposing edges that each extend a longitudinal length of the substrate and wherein the opposing faces are oriented transverse to a thickness of the substrate layer defined by a length of the opposing edges; and
   an adhesive layer secured to at least one of the faces of the substrate layer such that an edge of the adhesive layer is aligned with at least one of the opposite edges of the substrate layer and the adhesive layer has a thickness as defined by a dimension that is aligned with the thickness of the substrate layer and a width that is defined by a dimension that is transverse to the direction of the width and wherein a ratio of the thickness to the width of the adhesive layer is between about 2:1 and about 15:1.

9. The tape assembly of claim 8 wherein the adhesive layer is further defined as a first row of adhesive that is aligned with the at least one of the edges of the substrate layer and a second row of adhesive that is aligned with the other of the opposing edge of the substrate.

10. The tape assembly of claim 9 further defining a gap between the first row of adhesive and the second row of adhesive.

11. The tape assembly of claim 10 further comprising a third row of adhesive secured to the substrate layer and positioned in the gap between the first row of adhesive and the second row of adhesive.

12. The tape assembly of claim 9 having a roll shape such that the first second rows of adhesive of the adhesive layer are captured between the substrate layer such that the adhesive layer is secured to one of the opposing faces of the substrate layer and in removable contact engagement with the other opposing face of the substrate layer at locations that are longitudinally offset from one another relative to the roll shape.

13. The tape assembly of claim 8 wherein thickness of the adhesive layer is at least 0.003 inches.

14. The tape assembly of claim 8 wherein an adhesive of the adhesive layer is selected from the group consisting of polyurethane gel adhesive, silicone gel adhesive, and acrylic gel.

15. The tape assembly of claim 8 wherein the adhesive layer is formed by an adhesive having a contact tack generated elongation of at least 25% when engaged with a polycarbonate material.

\* \* \* \* \*

UNITED STATES PATENT AND TRADEMARK OFFICE
CERTIFICATE OF CORRECTION

| | |
|---|---|
| PATENT NO. | : 8,852,729 B1 |
| APPLICATION NO. | : 13/834151 |
| DATED | : October 7, 2014 |
| INVENTOR(S) | : David J. Gruenwald |

It is certified that error appears in the above-identified patent and that said Letters Patent is hereby corrected as shown below:

IN THE CLAIMS:

Claim 1, column 10, line 33, delete "0.03" and substitute therefore -- 0.003 --.

Signed and Sealed this
Ninth Day of August, 2016

Michelle K. Lee
*Director of the United States Patent and Trademark Office*